United States Patent
Gundotra et al.

(10) Patent No.: US 8,630,398 B2
(45) Date of Patent: Jan. 14, 2014

(54) INTEGRATION OF CARRIERS WITH SOCIAL NETWORKS

(75) Inventors: Vic P. Gundotra, Los Gatos, CA (US); Matthew E. Waddell, Mountain View, CA (US); Shimrit Ben-Yair, Sunnyvale, CA (US); Jonathan Terleski, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/336,922

(22) Filed: Dec. 23, 2011

(65) Prior Publication Data

US 2012/0163574 A1 Jun. 28, 2012

Related U.S. Application Data

(60) Provisional application No. 61/426,907, filed on Dec. 23, 2010.

(51) Int. Cl.
*H04M 15/00* (2006.01)
*H04M 3/42* (2006.01)

(52) U.S. Cl.
USPC ............................... 379/114.03; 379/201.02

(58) Field of Classification Search
USPC ........... 379/114.03, 121.02, 201.02; 455/406, 455/414.1; 709/206
See application file for complete search history.

(56) References Cited

U.S. PATENT DOCUMENTS

| | | | |
|---|---|---|---|
| 2008/0293390 A1* | 11/2008 | Yang et al. | 455/414.1 |
| 2009/0310768 A1 | 12/2009 | Hansen et al. | |
| 2010/0250687 A1 | 9/2010 | Smith et al. | |
| 2010/0261460 A1 | 10/2010 | Gosselin et al. | |
| 2010/0279666 A1 | 11/2010 | Small et al. | |
| 2012/0203846 A1* | 8/2012 | Hull et al. | 709/206 |

OTHER PUBLICATIONS

International Search Report & Written Opinion for Application No. PCT/US11/67255, dated Apr. 27, 2012, 12 pages.
International Preliminary Report on Patentability in International Application No. PCT/US2011/067255, mailed Jul. 4, 2013, 7 pages.

* cited by examiner

*Primary Examiner* — Quoc D Tran
(74) *Attorney, Agent, or Firm* — Fish & Richardson P.C.

(57) ABSTRACT

In general, the subject matter described in this specification can be embodied in methods, systems, and program products for receiving, at a server system of a social network and from a telephone service provider, information identifying members of a preferred calling group for a first user that is associated with the telephone provider. The sever system of the social network identifies the first user as a member of the social network. The server system of the social network identifies one or more of the members of the preferred calling group as being one or more members of the social network. The server system of the social network automatically defines a social network group that includes the one or more members of the preferred calling group who are members of the social network.

29 Claims, 9 Drawing Sheets

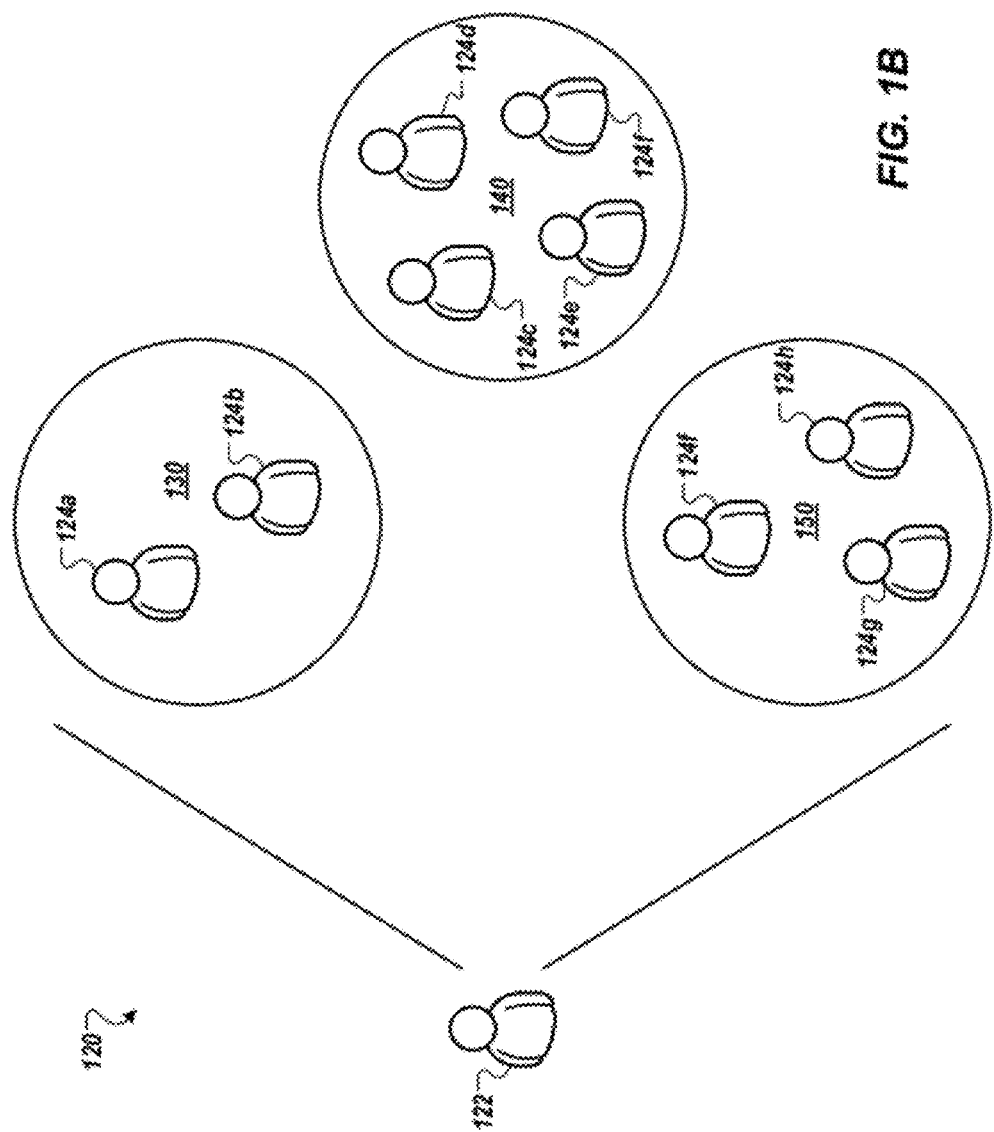

FIG. 3B

INTEGRATION OF CARRIERS WITH SOCIAL NETWORKS

CROSS-REFERENCE TO RELATED APPLICATIONS

This application claims the benefit under 35 U.S.C. §119(e) of U.S. Patent Application No. 61/426,907, entitled "INTEGRATION OF CARRIERS WITH SOCIAL NETWORKS," filed Dec. 23, 2010, which is incorporated herein by reference in its entirety.

BACKGROUND

This specification generally relates to systems and techniques for integrating information from a social network with operations of a telecommunication carrier that does not operate the social network.

Users of computing devices, such as desktop computers, laptop computers, tablet computers, and smartphones are increasingly connecting with those devices. While early personal computers were stand-alone devices, users eventually equipped the devices with dial-up modems for accessing bulletin boards. The bulletin boards enabled for posting and sharing information with each other—early social interaction by computer. The internet and World Wide Web provided richer social experiences such as newsgroups, electronic mail, and web browsing. High-speed internet connections allowed people always remain connected, and further improved the quality of services that could be offered to users over the internet.

Through the use of web server programming, discussion groups and discussion threads have been extended to provide users with the ability to subscribe to secured discussion forums that are, in some cases, moderated by other users. And as another extension, "social network" applications allow people to voluntarily (e.g., and unilaterally or bilaterally) define acquaintance relationships with each other as "friends" or "followers" of each other's posted messages. Users generally post brief messages about their status, mood, activities, and such, and their friends and followers can read and optionally reply to those messages. As such, friends may stay abreast of another's activities as a tool for maintaining and improving their social relationships.

SUMMARY

This document discusses systems and techniques that may be used to share information between telecommunications carriers, such as cellular telephone companies, and operators of social networking systems. For example, users of a social networking system may define sub-groups of their overall group of defined acquaintances, in the form of "circles". As one example, a particular user may define a circle for her family, another for her professional network, another for old high school friends, another for her book club, and another for ex-boyfriends. The user can define which of her communications are shared with members of which circles, and which of her communications are blocked from being shared with members of which circles (e.g., ex-boyfriends, even if they are in other circles). And as described in detail below, the user can have a special reduced-price calling circle that is defined by her wireless carrier and shared with her social network (or vice-versa). For example, when the user joins the social network or signs up with a new wireless carrier, she can give the social network permission to access data from her wireless carrier. The accessed data may identify other users with whom the first user has set up a limited-reach free-calling plan (e.g., the wireless carrier may limit such a group to a certain number of other users, and may also limit it only to users who subscribe to the same carrier). Such an action may cause the social network to obtain telephone numbers or other identifiers for the other users, to use the identifiers to determine if the other users are members of the social network, and to define a circle comprised of those other users, e.g., a circle called "free telephone group" (e.g., because it represents the users whom she can call for free under the limited-reach free-calling plan).

Communication of acquaintance data may also occur in the opposite direction (from social network to wireless carrier). Specifically, a user may initially define in her social network a "free telephone group" circle, or may add members to and remove members from, the "free telephone group" that was defined as discussed in the previous paragraph. She may then cause the members of the circle to be exported to her wireless carrier. Again, identifying information, such as cellular telephone numbers obtained from profile pages for the other users, may be transmitted to the wireless carrier. The wireless carrier may then add those numbers to a reduced-price calling plan for the user, thus allowing the user to make unlimited calls to those numbers without additional charge. In certain circumstances, the carrier may offer such a plan even where some of the other users are not subscribers of that carrier (e.g., the carrier may absorb carrying charges paid to other carriers in such instances).

As additional description to the implementations described below, the present disclosure describes the following implementations:

Implementation 1 is a computer-implemented method of sharing social information between a social network service and a telephone service provider. The method includes receiving, at a server system of a social network and from a telephone service provider, information identifying members of a preferred calling group for a first user associated with the telephone provider. The method includes identifying, using the server system, the first user as a member of the social network. The method includes identifying, using the server system, one or more of the members of the preferred calling group as being one or more members of the social network. The method includes automatically defining, using the server system of the social network, a social network group that includes the one or more members of the preferred calling group who are members of the social network.

Implementation 2 is the method of implementation 1, wherein defining the social network group comprises adding the one or more members to a preexisting group.

Implementation 3 is the method of any one of implementations 1-2, wherein the information identifying members of the preferred calling group for the first user comprises telephone numbers for members of the preferred calling group.

Implementation 4 is the method of implementation 3, wherein identifying one or more of the members of the preferred calling group as being members of the social network comprises comparing the received telephone numbers with telephone numbers in profiles of registered members of the social network, the telephone numbers in profiles of the registered members being visible in the profile pages to at least one other member of the social network.

Implementation 5 is the method of any one of implementations 1-4, wherein the method further includes receiving, from the first user, a desired change to membership of the defined social network group. The method further includes sending, by the server system of the social network, to the telephone service provider, an indication of the desired change.

Implementation 6 is the method of any one of implementations 1-5, wherein the method further includes receiving, at the server system of the social network and from the first user, an indication of a second user to be included in a no contact group. The method further includes sending, to the telephone service provider, information identifying the second user for special handling of incoming calls from the second user.

Implementation 7 is the method of implementation 6, wherein the method further includes automatically blocking posts submitted by the first user to the server system of the social network from being seen by the second user included in the no contact group.

Implementation 8 is the method of any one of implementations 1-7, wherein the method further includes automatically causing ring tones for a telephone of the first user to correlate to multiple respective social network groups of the first user.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Implementation 9 is a computer-implemented system for sharing social information between a social network service and a telephone service provider. The system includes a social network server system to implement a social networking service. The social network server system includes a social graph that defines connections between registered users of the social networking service. The social network server system includes a grouping sub-system arranged to define sub-groups of registered users who have an acquaintance relationship with a first user, wherein each sub-group is defined based on a relationship that applies to each user in the sub-group. The social network server system includes an interface arranged to communicate with a telephone service provider and to send to the telephone service provider an indication of users in a preferred calling sub-group so as to cause the telephone service provider to offer the first user preferred services for telephone communications between the first user and the users in the preferred calling sub-group.

Implementation 10 is the system of implementation 9, wherein at least one user in the preferred calling sub-group is not a subscriber of the telephone service provider and is a subscriber of a different telephone service provider.

Implementation 11 is the system of any one of implementations 9-10, wherein the grouping sub-system is arranged to (i) allow the first user to change membership of the preferred calling subgroup by adding or removing registered users who have an acquaintance relationship with the first user to or from the preferred calling sub-group, respectively, (ii) receive an identification of a change desired by the first user to the membership of the preferred calling sub-group, and (iii) send, via the interface and to the telephone service provider, an indication of the change.

Implementation 12 is the system of any one of implementation 9-11, wherein the social network server system is programmed to obtain telephone information that is included in profiles for the users of the preferred calling sub-group, and to send the telephone information to the telephone service provider.

Implementation 13 is the system of any one of implementations 9-12, wherein the grouping sub-system is arranged to use telephone numbers that have been received from the telephone service provider to identify those registered users of the social network service who are in a preferred calling plan that is offered to the first user by the telephone service provider, and wherein identifying the registered users who are in the preferred calling plan comprises comparing the telephone numbers with telephone numbers in profiles of registered users of the social network service, the telephone numbers in the profiles of registered users being visible in profiles of the registered users to at least one other registered user of the social network service.

Implementation 14 is the system of any one of implementations 9-13, wherein the grouping sub-system is arranged to manage a no contact sub-group defined by the first user, and to send, via the interface and to the telephone service provider, information for causing the telephone service provider to block calls that are to the first user and from one or more users in the no contact sub-group.

Implementation 15 is the system of implementation 14, wherein the social network server system further includes a messaging sub-system arranged to automatically block posts that are authored by the first user from being presented for display to the one or more users in the no contact sub-group.

Implementation 16 is a computer-implemented method of sharing social information between a social network service and a telephone service provider. The method includes identifying, by a server system of the telephone service provider, a first user of the telephone service provider and one or more other users of the telephone service provider who are members of a preferred calling plan that is provided for the first user by the telephone service provider. The method includes obtaining, by the server system of the telephone service provider, information that identifies the first user and the one or more other users. The method includes providing the obtained information to a social network server system that implements a social networking service for definition, by the social network server system, of a sub-group of those registered users of the social networking service with which the first user has an acquaintanceship relationship, the sub-group containing the one or more other users.

Implementation 17 is the method of implementation 16, wherein the method further includes receiving, from the social network server system and by the telephone service provider server system, a request that the telephone service provider server system provide sub-group information for the first user, the request including an identifier for the first user. The method further includes, in response to receiving the request, transmitting the obtained information to the social network server system.

Implementation 18 is the method of implementation 17, wherein the identifier comprises a telephone number for the first user that is visible to one or more other users of the social networking system in a profile page for the first user.

Implementation 19 is the method of any one of implementations 16-18, wherein the method further includes, after providing the obtained information, receiving, from the social network server system and by the telephone service provider server system, identifiers for one or more users of the telephone service provider that are not the one or more other users who are the members of the preferred calling plan, and updating membership of the preferred calling plan to include the one or more users of the telephone service provider that are not the one or more other users.

Implementation 20 is the method of any one of implementations 16-19, wherein the method further includes billing calls between the first user and users of the preferred calling plan in a preferred manner compared to calls between the first user and users that are not in the preferred calling plan.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Implementation 21 is a computer-implemented system for sharing social information between a social network service and a telephone service provider. The system includes a telephone service provider server system. The telephone service provider server system includes a connection system arranged to transmit voice data between callers and callees. The telephone service provider server system includes a billing module to track calls made between the callers and callees and to adjust accounts of at least some of the callers and callees, wherein certain of the callers and callees are members of preferred calling plans for which the billing module applies special adjustment rules. The telephone service provider server system includes a social interface programmed to communicate with one or more social networking systems and to update membership in at least some of the preferred calling plans based on information that is received from the social networks.

Implementation 22 is the system of implementation 21, wherein the telephone service provider server system is programmed to receive, from the one or more social network server systems, requests that the telephone service provider server system provide sub-group information for one or more subscribers of the telephone service provider system, and in response to receiving at least some of the requests, to transmit the sub-group information to the one or more social networking server system, the sub-group information identifying membership in the preferred calling plans.

Implementation 23 is the system of any one of implementation 21-22, wherein the telephone service provider server system is programmed to receive, from the one or more social networking server systems, identifiers for members of the preferred calling plans, and to update membership of the preferred calling plans to include the identified members.

Implementation 24 is the system of implementation 23, wherein the telephone service provider server system is programmed to bill calls between subscribers in a preferred manner based on information about membership in social networking service sub-groups received from the one or more social networking systems.

In one implementation, a computer-implemented method of sharing social information between a social network service and a telephone service provider is disclosed. In addition, one or more recordable storage media are disclosed that have instructions recorded on them, where the instructions perform a corresponding method when executed. The method comprises receiving, at a server system of the social network and from a telephone service provider, information identifying members of a preferred calling group for a first user with the telephone provide; identifying, using the server system, the first user as a member of the social network; identifying, using the server system, one or more of the members of the preferred calling group as being members of the social network; and automatically defining, using a server system for the social network, a social network group that includes the one or more members of the preferred calling group who are members of the social network. The method can also include labeling the defined social network group with a label that correlates, for the first user, the defined social network group to the preferred calling group. Also, defining the social network group can comprise adding the one or more members to a preexisting group. Moreover, the information identifying members of the preferred calling group for the first user can comprise telephone numbers for members of the preferred calling group.

In some aspects, identifying one or more of the members of the preferred calling group as being members of the social network comprises comparing the received telephone numbers against telephone numbers in profiles of registered members of the social network service. The method also can include receiving changes to membership of the defining social network group from the first user, and reporting, with the social network server system and to the telephone service provider, the changed membership. In addition, the method can involve receiving, at the social network system from the first user, indications of users for a do not contact group, and identifying the users in the do not contact group to the telephone service provider for special handling of incoming calls from members of the do not contact group by the telephone service provider. Moreover, the method can comprise automatically providing to the telephone service provider information about the do not contact group, automatically blocking posts by the first user from being seen by members of the do not contact group, and automatically causing ring tones for the first user's telephone to correlate to social groups in the first user's social network with the social network service.

In another implementations, a computer-implemented system for sharing social information between a social network service and a telephone service provider is disclosed. The system comprises a social network server system that includes a social graph that defines connections between registered users of a social networking service that is implemented by the social network server system; a grouping sub-system arranged to execute on the social network system that groups registered users who have an acquaintance relationship with a first user into sub-groups of users, wherein each sub-group has a defined relationship that applies to each member of the sub-group; and an interface arranged to communicate with a telephone service provider and to report to the telephone service provider users in a preferred calling sub-group for the telephone service provider to offer the user preferred services for telephone communications with the users in the preferred calling sub-group. The group sub-system can be arranged to identify one or more noncommunication sub-groups for registered users, and to provide information about the sub-groups to the interface for notifying the telephone service provider to block calls from members of the noncommunication sub-groups. Also, members of the preferred calling sub-group might not be not limited by the system to a same telephone service provider that is used by the user, and the social network server system can be programmed to label a social network circle with a label that correlates, for the first user, the social network circle to the preferred calling sub-group. The system may also include a grouping sub-system that allows the first user to move acquaintances into and out of the preferred calling sub-group.

In yet another implementation, a computer-implemented method of sharing social information between a social network service and a telephone service provider is disclosed. In addition, one or more recordable storage media are disclosed that have instructions recorded on them, where the instructions perform a corresponding method when executed. The method comprises identifying, by a server system of the telephone service provider, a first user of the telephone service provider and one or more other users who are members of a preferred calling plan for the first user; obtaining, with the server system, information for identifying the first user and the one or more other users; and providing the obtained identifying information to a social network server system for definition, by the social network server system, of a social networking circle of the first user that contains the other users. The method may also comprise receiving, from the social network server system at the telephone service provider server system, a request for group information for the first user that includes an identifier for the first user, and in response, transmitting the obtained information to the social network server system. The identifier can comprise a telephone number for the first user obtained from a profile page for the first user at the social network server system. The method can additionally comprise, after transmitting the obtained identifying information, receiving, from the social network server system at the telephone service provider server system, identifiers for members of the preferred calling plan, and updating membership of the preferred calling plan to include the identified users. Moreover, the method can include billing calls between the first user and users of the preferred calling plan in a preferred manner compared to calls between the first users and users not in the preferred calling plan, and also determining, before providing the obtained identifying information to the social network server system, the social network server system has previously obtained authorization to receive the obtained identifying information.

In another implementation, a computer-implemented system for sharing social information between a social network service and a telephone service provider is disclosed that comprises a telephone service provider server system that includes a connection system arranged to transmit voice data between callers and callees; a billing module to track calls made between the callers and callees and to adjust accounts of callers and callees, wherein certain callers and callees are members of preferred calling plans for which the billing module applies special adjustment rules; and a social interface programmed to communicate with one or more social network systems and to update membership in the preferred calling plans based on information received from the social networks. The telephone service provider server system can be programmed to receive, from the social network server systems, requests for group information for one or more subscribers to the telephone service provider system, and in response, to transmit the information about membership in the preferred calling plans to the social network server systems. The requests can each include identifiers that comprise a telephone number for a subscriber of the telephone service provider system obtained from a profile page for the subscriber at the particular social network server system.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1B is a diagram of an example social network including social networking circles.

FIG. 3B depicts a screen shot of an example graphical user interface for adding users to a particular social networking circle, such as a calling-related social networking circle.

DETAILED DESCRIPTION

Figure 1A:
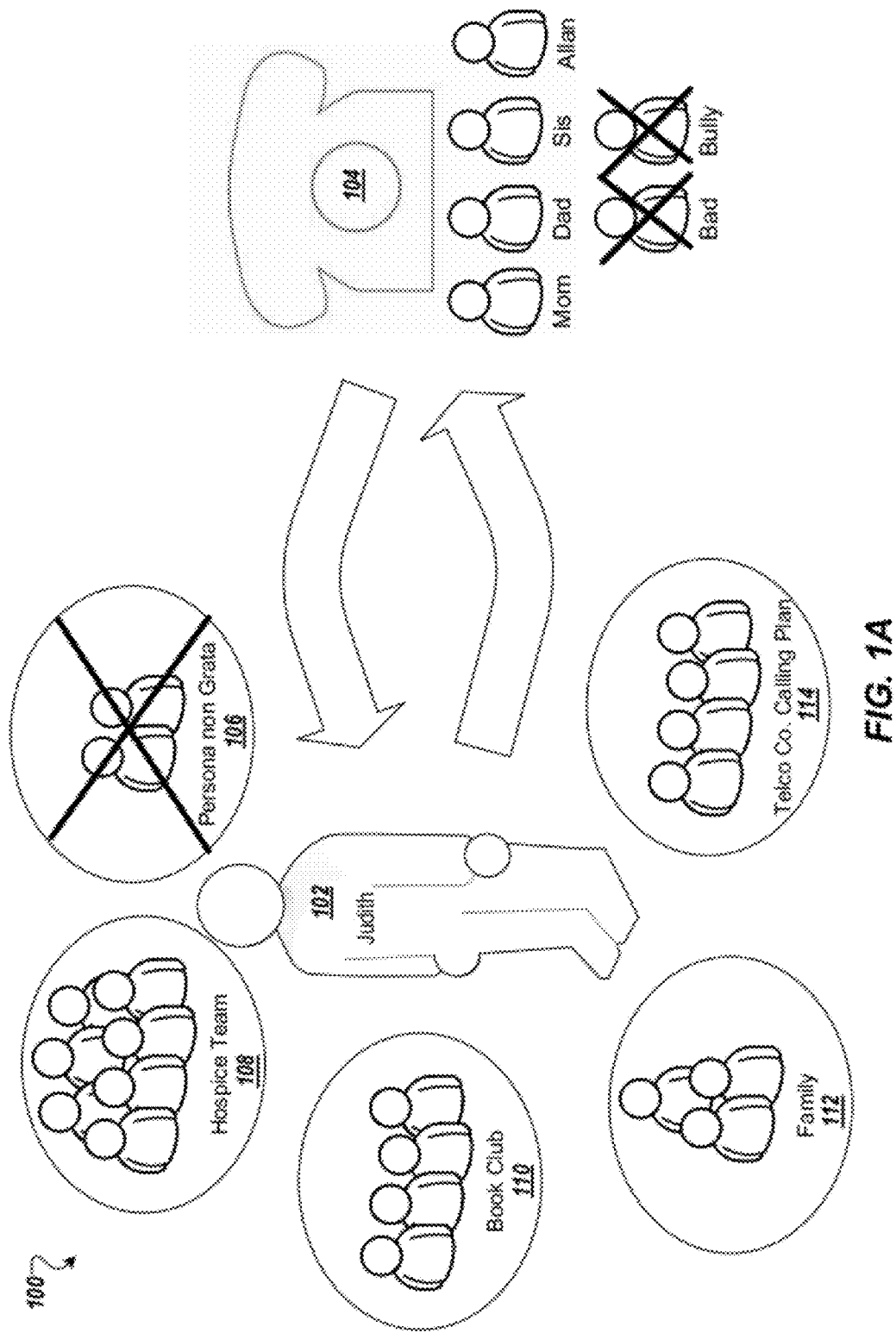
FIG. 1A is a conceptual diagram showing sharing of member information between a social network and a telephone service provider.

Large numbers of people have embraced the use of electronic social networking services as tools for building and maintaining networks of personal, familial, academic, professional, and other interpersonal relationships. These networks can grow and overlap in ways that may give rise to new concerns. One of the concerns among users of traditional social networking services is that posts that are relevant or intended for consumption by one subgroup of the user's contacts, or acquaintances, may be irrelevant, uninteresting, or even embarrassing or offensive when read by other contacts. For example, a user's contact list may include friends, coworkers, and family, and there may be some overlap among those groups (i.e., a coworker who is also considered to be a friend, a family member who is also a coworker).

Social networking circles may be used in a social networking system to better align the natural social groups of a user in the real world with the representation of the user's social life in the social networking service. In general, social networking circles are categories to which a user can assign their social networking contacts and better control the distribution and visibility of social networking posts. In accordance with the present disclosure, a social networking circle is provided as a data set that defines or references a collection of contacts that are associated with one another in a computer-implemented social networking service, according to some group characteristic. Generally, a social networking circle can be described from the perspective of an individual who is the center of a particular collection of socially interconnected people, or from the aggregate perspective of a collection of socially interconnected people. A social networking circle can have narrowly defined boundaries, all of the members of the social networking circle may be familiar with one another, and permission may be required for a member to join a social networking circle. In accordance with the present disclosure, a user of the social networking service defines a social networking circle. The social networking circle, as a data set defining a collection of contacts, may reflect a real-life social networking circle of the user.

When a user simply posts a message to all of the user's contacts on a traditional social networking service, the message could be irrelevant and/or embarrassing if viewed by a particular sub-group of the user's contacts. For example, a post about a technical nuance of the user's job may be interesting to the user's coworkers, but uninteresting to the user's family. As such, the uninterested contacts may begin to ignore the user's posts, request that the user's posts be "hidden" from view when they access the social network, or even remove him as a contact entirely in an effort to reduce the number of uninteresting posts they see. In a more serious example, the user may post that he's "running late for work," which may be harmless if read by the user's friends, but may be personally or professionally damaging if read by the user's coworkers (e.g., boss) or family (e.g., mom). As such, the user of a traditional social networking service may simply choose to censor himself, not post anything and/or restrict the people he keeps on the user's contact lists. These options can be associated with their own drawbacks. In the case of self-censorship, the user and some of the user's contacts may be less freely able to exchange information and take full advantage of the social network. In the case of restricting contacts, the user may be forced to narrow the focus of the user's electronic social network to a selected category of contacts (e.g., to include only family, or only coworkers), which again restricts the user's ability to interact with other online contacts and take full advantage of the social networking service.

Through the creation and use of social networking circles, the user can organize and categorize social networking contacts into various different groupings that can be used to control the visibility and access that those contacts have to the user's postings, digital pictures, videos, audio files, hyperlinks (e.g., uniform resource indicators, URIs), and/or other content associated with the user's social networking profile. Returning to an earlier example, the user could post an update about the aforementioned technical nuance to only a "coworker" circle, and spare other contacts from seeing information that is likely irrelevant or of little interest to them.

In addition, particular social networking circles may be assigned a significance that allows the social network system to communicate automatically with other systems outside the social network system, regarding parameters of the circles that are so defined. As one example, the social network system may communicate with a telecommunications carrier system that manages call routing and billing for telephone users. A user may, as one example, define at either system a group of certain other users (e.g., via name or telephone number) with whom the user wants to communicate via a preferred calling plan. (Such a plan may be provided by the telecommunications carrier to permit the identification of a limited number of other users for who incoming and outgoing calls from and to the user will not be billed or will be billed at a reduced rate.) The group that is so defined may be shared with the other system automatically, e.g., so that a social networking circle may be defined that matches the group, or so that the user may easily use the social networking system to edit who is part of the group included in the preferred calling plan (e.g., with such a change optionally automatically updated by the telecommunications provider). Such a change may be particularly convenient where the social network provides a rich and integrated user interface, and the telecommunications provider does not.

FIG. 1A is a conceptual diagram showing sharing of member information between a social network and a telephone service provider 104 (which may be a telecommunications carrier). In general, the system 100 shown in FIG. 1A provides for the sharing of information about social contacts that a user may maintain for use with both a social network and the telephone service provider 104. Social contacts associated with the telephone service provider 104 are generally lists of other telephone users (e.g., users who subscribe with the particular telephone service provider 104) whom a first user 102 (indicated here as "Judith") has identified as subscribers with whom she would like to talk by phone with no effect on her monthly allotment of network minutes. Such programs are favored by telephone service providers because they help promote retention by making membership with the particular provider a group effort and group decision.

In this example, user 102 has four other subscribers in the user's preferred calling plan (labeled here as "Mom", "Dad", "Sis", and "Allan"). The telephone service provider 104 may offer a service by which user 102 is able to include up to 5 (or some other predetermined number) of telephone numbers that the provider 104 will track for purposes of billing. When calls are made to or from those other telephone numbers—which the provider 104 may limit to being telephone numbers of in-system subscribers—the calls may not count against the user's 102 monthly plan minutes, may not be billed to the user 102, or may be billed at a reduced rate (either in terms of consumed minutes or billed currency).

In addition, two other people, known here as "bad" and "bully", are on a "do not connect" list. Specifically, when the telephone service provider 104 identifies a call coming to user 102 from a telephone number that is associated by the provider 104 with one of those two users, the provider 104 may prevent the call from going through, and may instead play a message to the caller indicating that the user 102 is busy or unable/unwilling to take the call.

To the left side of the figure, user 102 is shown in FIG. 1A as surrounded by circles that are part of the user's social network at a social networking service. In this example, user 102 has created a number of different circles, each of which includes one or more of the user's acquaintances from the social network. For example, a "hospice team" circle 108 includes seven people who volunteer with the user 102 in a hospice program, and they may share posts about caring for sick patients and other topics that may be of interest in the work that they do. Those posts, when they are indicated by a user as being directed to the circle 108, may be viewable only by the eight members of the circle 108, and not to friends of those members or other users of the social network.

The user 102 has also define a "book club" circle 110 that includes four other members of a book club with whom she meets each month. The members of the book club circle 110 may have no overlap with the members of the hospice team circle 108, or the two circles may have one or more overlapping members. For example, perhaps the user 102 invited one of the user's other volunteers from the hospice team to be part of the user's book club. The user 102 may then assign that other user to both circles.

As shown in FIG. 1A, a "family" circle 112 includes, as its name suggests, members of the user's 102 family. Certain communications by the user 102 may thus be directed to this circle 112, such as updates about other family members or posts directed toward planning an upcoming family reunion.

Two other circles 106, 114 are directed to the user's interaction with the telephone service provider 104. The "persona non grata" circle 106 represents other users with whom the user 102 does not want to communicate. For example, the user 102 may have received friend requests from her ex-boyfriends, "bad" and "bully," and may not want to put them off by failing to friend them, but at the same time may not want them to receive communications from the user. She may thus place them in the circle 106 by dragging the icons that represent those users into the circle 106, including in manners discussed with respect to FIG. 3B below. Similarly, a "telecommunication company calling plan" circle 114 may represent other users with whom the user 102 wants to communicate telephonically (e.g., by either traditional or VoIP telephone). The communications may be directed toward a verbal communication outside the operation of the social network, rather than primarily to communications that would be conducted by typing messages in the social network. For such communications, it may be more convenient for a user to select other users in the preferred calling plan on a computer with a graphical interface, than it would be when using the user's telephone and working through an interactive voice response (IVR) system. Thus, in the manners like those discussed below, the user 102 may drag icons for certain other users, who she would like to have added to the user's preferred calling plan, into the telecommunication company calling plan circle 114.

Arrows directed between the user 102 and the telephone service provider 104 indicate sharing of user information between the two systems. In particular, information about members of a preferred calling plan may move in both directions in the system 100. In a first direction, from the telephone service provider 104 to the social network, information associated with a pre-existing preferred calling plan may be communicated. For example, the user 102 may have previously registered with a cellular telephone carrier and may have submitted telephone numbers for other users whom she would like to contact for a reduced fee, using an IVR or other similar mechanism. When the user joins a social network, the user may not want to have to look up telephone numbers for each of the other users in the preferred calling plan. So, the user may sign up with the social network, which may contact the telephone service provider 104 to obtain identifying information for the members of the preferred calling plan. In a typical example, the telephone service provider 104 may then pass to the social networking system one or more telephone numbers associated with each of the members of the preferred calling plan. The social network system may then search for those telephone numbers or other identifying information, such as by searching profiles of registered members of the system, where the members may have entered their telephone contact information so that other members could call them. By performing such a lookup, a social networking system may automatically identify the particular other members who were to be added to the preferred calling plan circle 114 for the user 102, and may add them to the circle 114 automatically.

In the reverse direction, the communication may occur from a social network to the telephone service provider 104 by a user defining a calling plan circle 114 or editing the membership of the calling plan circle 114. For example, after a user has imported data for defining the calling plan circle 114 from the provider 104, the user 102 may recognize that she could add several additional friends to the preferred calling plan. She may drag icons for those friends into the circle 114, and that action may cause the social network to automatically contact the telephone service provider 104 to provide contact information for those friends who are newly added to the preferred calling plan circle 114. Such updating may occur automatically and be triggered by the social network whenever a change in membership is made to a calling plan circle 114 of any of the members of the social network who have previously synchronized with a telephone network such as the network of the telephone service provider 104.

Thus, in this manner, a user may more conveniently review and manage the user's selections for a preferred calling plan and may do so in a manner that best reflects the user's real-life relationships. For example, the user may become accustomed to managing relationships in a social networking application, and may readily recognize when someone has reached a level of friendship that qualifies that other user as being a close enough friend to be within the preferred calling plan (e.g., if the user and the other user are frequently instant messaging back and forth in the social network). Also, such an implementation may highlight the benefits of the preferred calling plan to the user 102, thereby providing additional loyalty by the user 102 toward the telephone service provider 104. Moreover, the telephone service provider 104 may provide preferred calling status to and from telephone numbers provided by the social network system, even where the users who are associated with the telephone numbers are not subscribers with the telephone service provider 104. In such a situation, the telephone service provider 104 may pick up or absorb particular carriage charges that are owed to other networks, such as the network of the other user (the friend), in return for being able to provide a preferred calling plan service to the user 102.

FIG. 1B is a diagram of an example social network 120 that includes social networking circles. The figure shows various forms of relationships that a user 122 may form with other users within the social network, in addition to those discussed above. Specifically, the figure shows a user 122 who is a member of a social network that supports the creation and use of social networking circles (e.g., the social network provided by the social network system 202 of FIG. 2, and the user may be user 102 in FIG. 1A). In the present example, the user 122 has a number of contacts 124a-124h with which the user 122 can have some form of relationship (e.g., one or more of friends, coworkers, customers, teammates, clients, relatives, club members, and classmates). The user 122 categorizes the contacts 124a-124h by assigning them to one or more social networking circles, such as a social networking circle 130, a social networking circle 140, and a social networking circle 150.

FIG. 1B shows social networking circles 130, 140, and 150. Social networking circle 130 includes contacts 124a, 124b. Social networking circle 140 includes contacts 124c, 124d, 124e, 124f. Social networking circle 150 includes contacts 124f, 124g, 124h. In some implementations, social networking circles are groupings created by the user 122. Such social networking circles may be known only to the user 122 (e.g., the contacts 124a, 124b may receive no indication that they are in the user's 122 social networking circle 130). In some implementations, personal circles are groupings created by the user 122 and may be known to the user 122 as well as the contacts (e.g., contacts 124a, 124b) that are members of the social networking circle (e.g., the contacts 124a, 124b receive an indication that they have been added to the social networking circle 130).

In some implementations, personal circles are groupings that may not be known to members of the social networking circle. For example, the contacts 124a, 124b may not receive an indication that they have been added to the social networking circle 130. The contacts 124a, 124b, however, may receive an indication that they have been added to an unspecified circle of user 122. In some implementations, the user 122 may employ social networking circles to organize contacts in order to discretely target which of the user's 122 contacts 124a-124h will see certain postings or have access to particular information. For example, the user 122 may be politically active and tend to post items that would be appreciated by some contacts and vigorously opposed by others. As such, the user can organize the user's contacts into "Left Political Philosophy Friends" and "Right Political Philosophy Friends" social networking circles. By doing so, the user 122 may better target selected postings to the people who would be most appreciative of such information, or conversely, may prevent such postings from being sent to those of contacts 124a-124h who may be offended by such information.

In some implementations, one or more default social networking circles can be defined or suggested to a user when the user subscribes to a social networking service. For example, "Friends," "Family," and "Coworkers" social networking circles can automatically be provided in a user's profile upon the user subscribing to the particular social networking service. Other social networking circles can automatically be provided including, for example, an "Acquaintances" social networking circle and/or a "Just Following" social networking circle. Although default social networking circles can be automatically provided, the user may have to actually populate the default social networking circles with contacts. For example, each of the default social networking circles may initially be empty of contacts, and the user populates each of the default social networking circles as discussed in further detail herein.

In some implementations, one or more default social networking circles can be automatically generated based on the user's profile information. For example, the user's profile may include demographic data (e.g., age), job data and/or interests data (e.g., sports, hobbies). Through data mining techniques (e.g., clustering social networking circle creations over a threshold number of users), a provider of the social networking service may determine that users within a particular demographic typically create one or more particular types of social networking circles. By categorizing a user within a particular demographic, the provider of the social networking service can suggest or automatically generate one or more particular default social networking circles. For example, if a particular user falls within a demographic that corresponds to a high school student, a default "School Friends" social networking circle may be suggested to or automatically created for the user. As another example, if a particular user falls within a demographic that corresponds to a college student, a default "College Friends" social networking circle may be suggested to or automatically created for the user. Social networking circles can also be suggested to or created for a user based on interest data provided in the user's profile. For example, if a particular user's interests include skiing, a default "Ski Buddies" social networking circle may be suggested to or automatically created for the user.

As discussed herein, posts can be distributed to contacts within one or more social networking circles within the social network, such that the posts are exclusively viewable by the indicated contacts and/or contacts within the one or more social networking circles. For example, a user of the social networking service can generate a post and indicate one or more social networking circles for distribution of the post. In some implementations, an auto-complete component enables the user to type in part of the name of a social networking circle and/or individual contact to specify which social networking circles and/or individual contacts require delivery of the post content. During a post write-time, a post data set is transmitted from the user's client computing device (e.g., mobile device 240 of FIG. 2) to a distribution hub, which can be provided at a server (e.g., server system 202 of FIG. 2). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social networking circles), and identification (ID) data (e.g., an ID assigned to the post data set upon generation of the post).

In some implementations, the distribution data is processed to provide an access control list (ACL) that specifies which contacts within the social networking system are granted access to the post content. In some implementations, the distribution hub determines, based on the ACL, end points to which the post data set is to be distributed. More specifically, the set of contacts that care about the post and/or that are allowed access to the post is determined based on the ACL and the ID of the post. This set of contacts is written to a per user/view index at the distribution hub. When fetching posts to distribute to a user, the user/view index is accessed and the IDs of the various posts that the user is allowed to view are determined. The post data sets are retrieved from a data store and are transmitted to a client device associated with the requesting user.

Figure 2:
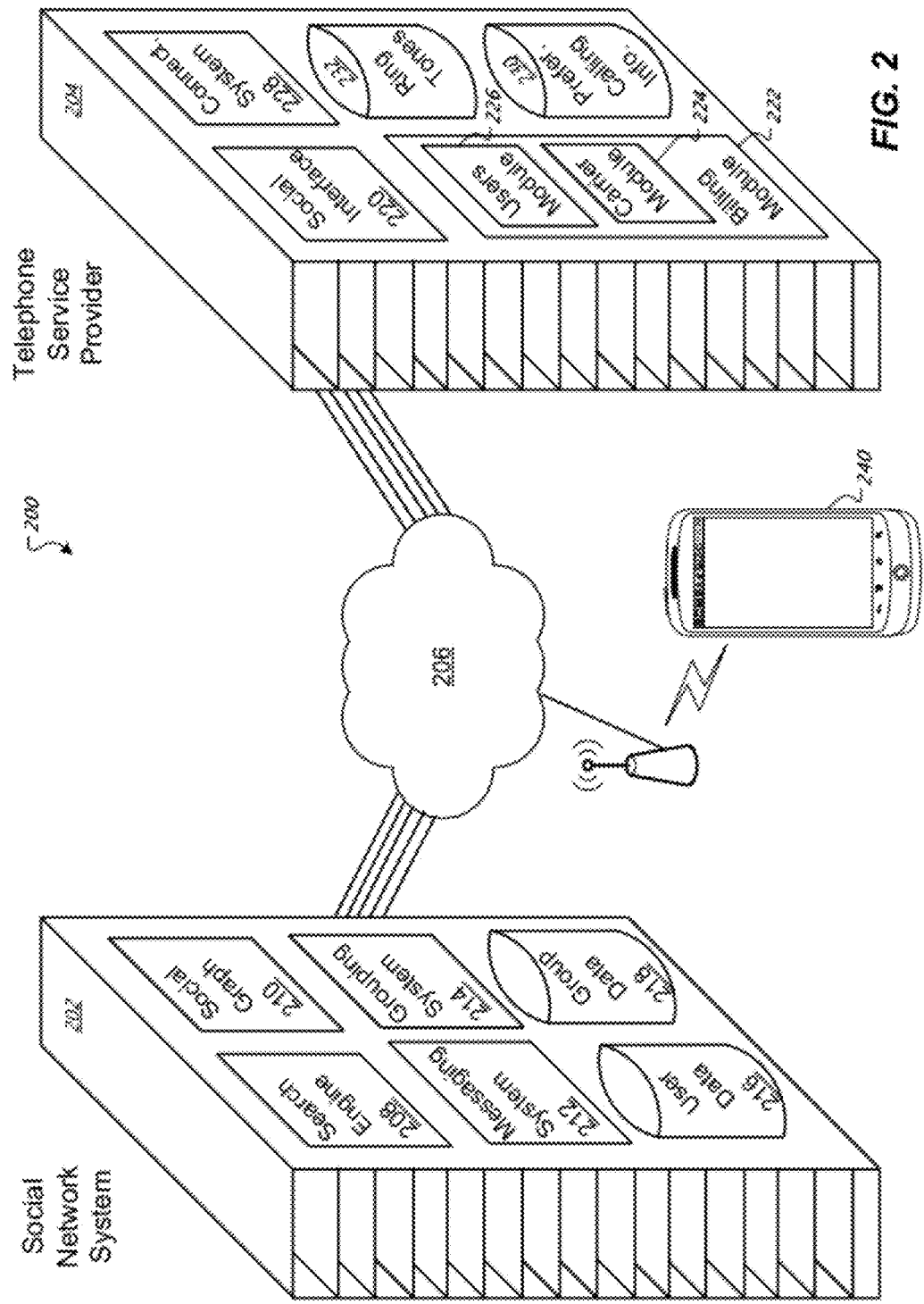
FIG. 2 is a block diagram of example components for sharing information between a social network and a telephone service provider.

FIG. 2 is a block diagram of example components for sharing information between a social network and a telephone service provider. The components are implemented as part of a system 200 that includes a social network system 202 and a telephone service provider system 204 that can communicate with each other via one or more networks, such as the internet 206. The systems 202, 204 may also communicate and provide services to computing devices of users who enroll with, or subscribe to, services provided by the particular systems 202, 204, such as wireless computing device 240. Each of the systems 202, 204 is shown as a rack of computer components to indicate that such systems are typically implemented as large-scale computing systems in networked centralized data centers.

The systems 202, 204 may be arranged to share information that is entered on, or updated by, one of the systems, but that can be used by the other system to provide improved services to subscribing users, such as a user of device 240. For example, telephone service providers system 204 includes various modules for performing telephone connection services and for managing such services. As one example, a connection system 228 may take a variety of well-known forms (e.g., implementing SS7, VoIP, etc.) for receiving telephone call requests and for linking a caller to a callee or callees. The connection system 228 may communicate with a billing module 222. The billing module 222 may be tasked with reconciling the costs of carrying telephone calls by the telephone service provider system 204. A users module 224 is a part of the billing module 222. The user's module may be responsible for generating and recording billing events for users who subscribe to the telephone service provider system 204. For example, the users module 224 may credit users with a certain number of minutes each month in the connection system 228 that the users may use to send or receive telephone calls, while the users module 224 may track the user's use of those minutes and keep track of the remaining minutes—notifying the connection system 228 when the minutes have expired so that an appropriate message may be sent to the user (e.g., so that the user may purchase additional minutes). In a similar manner, the system 204 may increment a dollar value owed by the user when calls are made or received.

In a similar manner, a carrier module 226 may be responsible for handling inter-carrier billing operations. For example, when one carrier completes a call from one of its subscribers to another user who is outside the system operated by that carrier, the one carrier may be required by contractual agreement, entered into with a carrier of the other user, to make payments to the other carrier for the call. Mechanisms for making such transactions and for handling offsetting payments (e.g., when users for two different networks make calls in both directions between the networks) are well-known and a particular mechanism for such operations is not described herein.

A ring tones data store 232 may also be provided as a supplemental service for users of the system 204. The data store 232 may include various customizable ring tones that a user may download to their telephone so that particular ring tones will play when incoming calls are received from particular other telephone numbers. In certain instances, the system 204 may charge users an amount for the use of certain ring tones.

Preferred calling information data store 230 may be implemented to provide preferred calling plans to subscribers of the system 204. In particular, preferred calling information data store 230 may correlate accounts for particular users with telephone numbers or accounts for other users. The billing module 222, and in particular the user's module 124 may obtain the proper calling information data store 230 when users make calls, so as to determine an amount by which to decrement available minutes to a caller or an amount to charge a caller (e.g., to not charge minutes if the other party to a call is part of a preferred calling plan).

Social interface 220 may also be added to the service provider system 204. The social interface 220 may to receive information from the social network system 202, and provide social-related information to the social network system 202. The social interface 220 may be programmed with routines for querying other components of the system 204 in order to obtain information needed by the social network system 202. For example, if the social network system 202 provides, to the social interface 220, an identifier for a particular user—such as a username, a common user ID number, or a telephone number for the user—the social interface 220 may supply the identifier to the preferred calling information data store 232 to identify telephone numbers for people in the user's preferred calling plan. The social interface 220 may then forward the telephone numbers of the other people to the social network system 202 for use in manners like those discussed above and below.

Referring now to social network system 202 in FIG. 2, the components in the social network system 202 may implement traditional social networking functionality, and may provide additional functionality by communicating with the telephone service providers system 204. For basic social networking, a messaging subsystem 212 may be responsible for receiving textual messages from users of the system 202 and for forwarding those messages to other users of the system. In determining what other users are to see such messages, the messaging subsystem 212 may refer to a social graph 210. The social graph 210 may represent connections between users in the form of relationships that have been defined by the user. Certain forms of relationships may be implemented for the users in the form of social networking circles like those discussed above and below, and may be implemented technically (inside the system) as a graph in which users are nodes in the graph and connections between users are edges in the graph. Overlapping graphs may also be provided, where nodes in the overlapping graphs may represent advertisements that may be displayed to users, topics that are relevant to the interests of the users, and other such items. A grouping subsystem 214 may be used to interact with users of the system 202 in order to identify groups that such users will like to define, including groups in the form of social networking circles like those discussed above and below. The grouping subsystem 214 may refer to a group data store 218 in order to identify what grouping relationships have been defined by users of the system 202, or to automatically process actions based on group membership. For example, such automatic action may include definition of groups, such as calling plan groups, using information that the system 202 obtained from a telephone service provider system 204, as in manners described above and below.

A user data data store 216 may also be used to store information about particular users of the system. Such information may be presented and stored in the form of profiles for particular users, where the profiles store information that characterizes the users and that can be employed to provide improved services to the users. For example, a user may identify the user's interests and hobbies so that the system 202 can suggest to them circles that they may want to make themselves part of. Also, users may provide contact information, such as e-mail addresses and telephone numbers, so that other users of the system, such as users who may be identified as being friends in the system 202, may contact the user through the system 202 or outside of the system 202.

A search engine 208 may be used to provide various search functionality and other services within the system 202. In one example that is relevant here, the telephone service provider system 204 may request an updated list of members of a particular user's preferred calling plan in the system 202. The search engine 208 may provide a formatted form of the request in a query to the group data data store 218 using an identifier for the first user. The group data data store 218 may determine internal identifiers (e.g., internal user ID numbers) for members of the first user's preferred calling circle. The search engine 208 may then use the internal identifiers to query the user data data store 216 and receive telephone numbers, email addresses, and/or other externally relevant identifiers for those other users. The search engine 208 may then communicate with an interface (not shown) in system 202 that in turn passes the telephone numbers and/or other appropriate identifiers to the social interface 220 of the system 204. Thus, again, the system 200 may provide for convenient sharing of information between a telecommunications system and a social networking system in a manner that enhances the services provided by both systems and improves the user experience with both systems.

Figure 3A:
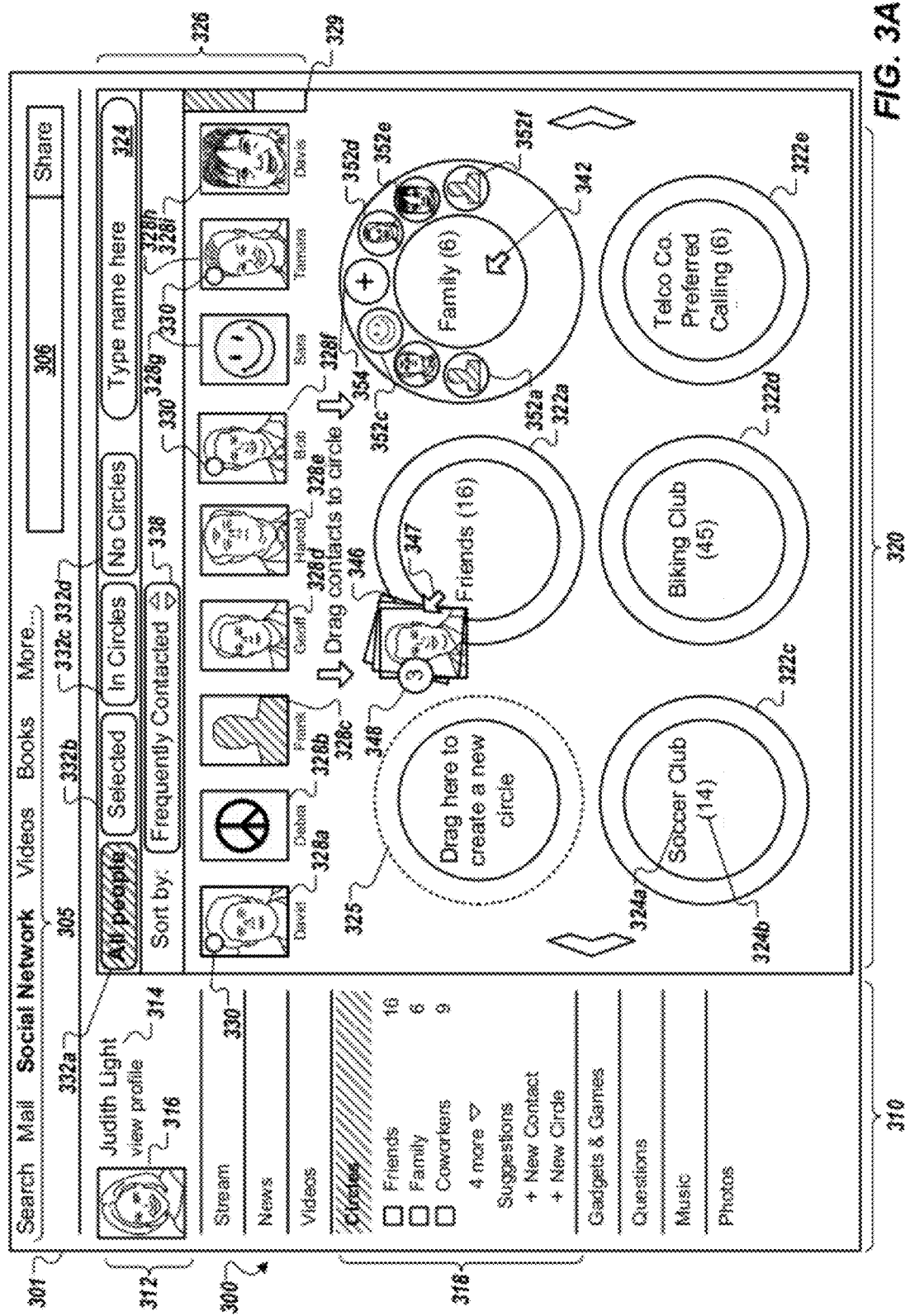
FIG. 3A depicts a screen-shot of an example graphical user interface for creating and maintaining social networking circles.

FIG. 3A depicts a screen-shot of an example graphical user interface for creating and maintaining social networking circles, including social networking circles that share information with other systems outside the social network. In the screen-shot 300, a social graph editor user interface (UI) 301 is shown. In some implementations, the UI 301 can be the interface that is presented by a purpose-made social networking application, while in some implementations, the UI 301 can be one or more web pages of a social networking website that is displayed in a general purpose web browser.

The UI 301 includes a number of choices that are presented in a menu bar 305. In the present example, the "Social Network" choice has been selected by a user. This selection causes a web-based social networking application to be executed, and a social network menu 310 to be displayed along the left edge of the UI 301. The social network menu 310 includes a profile indicator 312 in which information such as a user name 314 and a user image 316 associated with the currently logged in user (e.g., "Judith Light") are displayed.

The social network menu 310 also displays, among other items, a circles submenu 318. The circles submenu 318, when selected (e.g., as represented by the highlighting of the submenu's title), causes a social networking circle display 320 to be presented in the main field of the UI 301. The social networking circle display 320 includes a number of circles 322a-322e that are visual representations of various social networking circles that the user has created or has permission to edit. Each of the circles 322a-322e displays information about the social networking circle it represents. For example, the circle 322c displays a name 324a, and a count 324b of the number of contacts associated with the social networking circle. Similar information is displayed for other circles.

The social networking circle display 320 also includes a contact display 326 along its upper edge. The contact display 326 provides a graphical interface for viewing, selecting, and organizing items in the user's contact lists. A collection of contact icons 328a-328i represents the contacts or other entities (e.g., organizations, places, or other items) that are socially networked with the particular user. In some implementations, the icons can be digital images of the contacts they represent (e.g., the icons 328a, 328d), arbitrary images (e.g., the icons 328b, 328g), or placeholders (e.g., when the contact has no image associated with their account, such as the icon 328c). Contacts who are members of one or more of the user's social networking circles are identified by an indicator 330 superimposed upon the icons (e.g., the icons 328a, 328f, 328h). A scroll bar 329 is provided for the user to access additional contact icons that may not fit into the initial view.

A collection of filter buttons 332a-332d is provided to select subsets of the user's contacts. The "all people" filter button 332a, when selected, causes the contact display 326 to display the user's contacts with no filtering or substantially no filtering. The "selected" filter button 332b, when selected, causes the contact display to display only the contacts that have been selected by the user. For example, the user may select multiple contacts while in an "all people" view, and may then display only the user's selected contacts by pressing the "selected" filter button 332b. The "in circles" filter button 332c, when selected, causes the contact display 326 to display only or substantially only the contacts who share at least one social networking circle with the user. The "no circles" filter button 332d, when selected, causes the contact display 326 to display only or substantially only the contacts that are not in a social networking circle with the user (e.g., a Boolean "not" of the "in circles" group). A search input box 324 is provided so the user can type in all or part of a name, and the resulting matches will appear in the contact display 326.

A sorting selector 338 provides selections that the user may select in order to alter the way that the user's contacts are displayed in the contact display 326. For example, a "frequently contacted" selection may be chosen to sort the user's contacts according to how often the user communicates with the contacts (e.g., by tracking numbers or lengths of social networking circle posts, emails, instant messages, or telephone calls). In another example, a "number of circles" selection may be chosen to sort the user's contacts according to how many circles the contact shares with the user.

A posting box 306 is also provided in the UI 301, near the upper edge of the UI. The posting box 306 can be present across multiple web-based applications, such that a user can enter and publish a post from any of the multiple web-based applications, without having to go back to the social networking application to author and publish a post. For example, and as noted above, the posting box 306 is provided in the UI 301 of the social networking application. The user, however, may switch to work in another application. For example, the user may select "Mail" from the menu bar 305, upon which selection a web-based email application is executed. A UI of the web-based email application (not shown) will also include the posting box 306, such that the user can still post to the social networking service, even though the user is not directly working in the social networking application. The posting box 306 may also be implemented in a toolbar that may stay anchored in a single location and substantially maintain its appearance regardless of the application that is being used. Such a toolbar may communicate with the browser or applications, e.g., to determine what application was executing when a post was made, and to also determine the context of the application at the time the post was made so as to improve the system capabilities (e.g., so that the post may be accompanied by a "posted form email" note).

In the displayed state, the UI 301 is shown with the user adding a collection of selected contacts to the "friends" circle 322a by dragging them with a pointer 347. In some implementations, the user can select one or more contact icons 328a-328i by clicking, so-called shift clicking, lassoing, rubber-banding, or by performing other actions within the UI 301 to select one or more of the contact icons 328a-328i. The user then "drags" the selected contacts to a target social networking circle, which in this example is the "friends" social networking circle 322a. (Such dragging is prompted here by "Drag contacts" instructions shown in the middle of the circle 325.)

The selected contacts are represented by a selected contacts indicator 346. The selected contacts indicator 346 appears as a stack of the selected contacts' contact icons 328a-328i. For example, the selected contacts include the contact "Rob," and the contact icon 328f appears in the stack of the contacts indicator 346. A count indicator 348 is superimposed onto the contacts indicator 346 to display the number of contacts in the selected group (e.g., "3" in this example). The selected contacts indicator 346 may be "dragged" (e.g., moved) and "dropped" (e.g., released) onto a social networking circle to add the selected contacts to the selected social networking circle. In the illustrated example, the user appears to be dragging the selected contacts to make them members of the "friends" circle 322a. The user is also able to add contacts to a circle by selecting one or more of the contact icons 328a-328i, and then selecting one or more of a collection of circle selectors 349a-349c. For example, the user can click the contact icon 328a and then click the "coworkers" circle selector 349c to add "David" to the "coworkers" social networking circle 322e.

The selected contacts indicator 346 can also be dragged and dropped onto a new circle region, e.g., where the UI 301 shows blank space or an indicator 325 for making new circles. By dropping the selected contacts indicator 346 onto a new circle region, a process for creating a new social networking circle, of which the selected contacts will become members, is initiated. The user is also able to create a new circle by clicking the "new circle" selector 351. Where a labeled "new circle" region is shown (e.g., indicator 325), the act of dragging contacts to an open area may result in a cancellation of an action that was previously started, and the icons may "fly back" in the UI 301 to their original positions.

Separately in the UI 301, the "family" social networking circle 322b has been visually modified to display a number of member icons 352a-352f. The modification provides a visual representation of the contact icons (e.g., contact icons 328e, 328g, 328h, 352e) for contacts included in the social networking circle 322b. Such a modification may occur when the user hovers the pointer 342 over that circle (e.g., the dragging operation just described and the display of detail in the "family" social networking circle 322b might not ordinarily appear at the same time, but are shown simultaneously here for simplicity.) The modified social networking circle 322b also includes an add icon 354. The add icon, when selected, initiates a process for adding more contacts to the associated social networking circle 322b. For example, clicking the icon 354 can cause a dialog box or other user interface to appear, with which the user can interact to add contacts to the social networking circle 322b.

Certain social networking circles may be provided that have special functionality, not available for the other social networking circles, with data operators outside the social network. One such social networking circle is the "Telco Co. Preferred Calling" social networking circle 322e. From a user interface perspective, the social networking circle 322e acts like the other social networking circles described here, e.g., icons for members can be dragged in or out of the circle, typed posts can be shared with the members of the circle, the appearance of the circle can be modified to see more detail about the circle, etc.

The "Telco Co. Preferred Calling" social networking circle 322e has special functionality in addition, though. In particular, the social networking circle 322e represents a portal to the user's 316 wireless carrier preferred calling plan. That is, the social networking circle 322 represents a portal with an organization that is separate and distinct from the organization that operates the social network system. As a result, the "Telco Co. Preferred Calling" social networking circle 322e may have been defined automatically when the user 316 initially set up the user's social network, and the user may have been prompted to indicate whether the user had a particular wireless carrier, to provide permission for the social network to communicate information about the calling plan with the carrier, and to provide profile information so that the social network could accurately identify the user to the carrier via an automated electronic information exchange (e.g., via an application programming interface (API) defined by the social network that may use XML-formatted messages and the like). The social network may have then used the information to automatically contact the carrier, obtain information about the preferred calling plan (e.g., telephone numbers of other members in the plan), and cross-reference that information to existing members of the social network. Where those existing members were not already friends of the user 316 in the social network, the system may cause automatic friend requests to be generated, and may prompt the user 316 to send the requests. If the preferred calling plan members are not in the social network, the system may prompt the user 316 for more information about the other members (e.g., their email addresses), and may send an invitation to them to join the social network, where the invitation indicates that the other members too can manage their preferred calling plan memberships using a graphical user interface.

When the user drags other members in or out of the "Telco Co. Preferred Calling" social networking circle 322e, such action, when confirmed (e.g., after the user leaves the application), can result in an automated communication occurring between the social network and a carrier for the user. In particular, the social network can send a notice to the carrier, where the notice includes an identifier for the user and identifiers for members of the preferred calling plan circle. The carrier can then update its records so that the newly added members become part of the actual preferred calling plan, and the deleted members are no longer part of the plan.

Figure 3B:
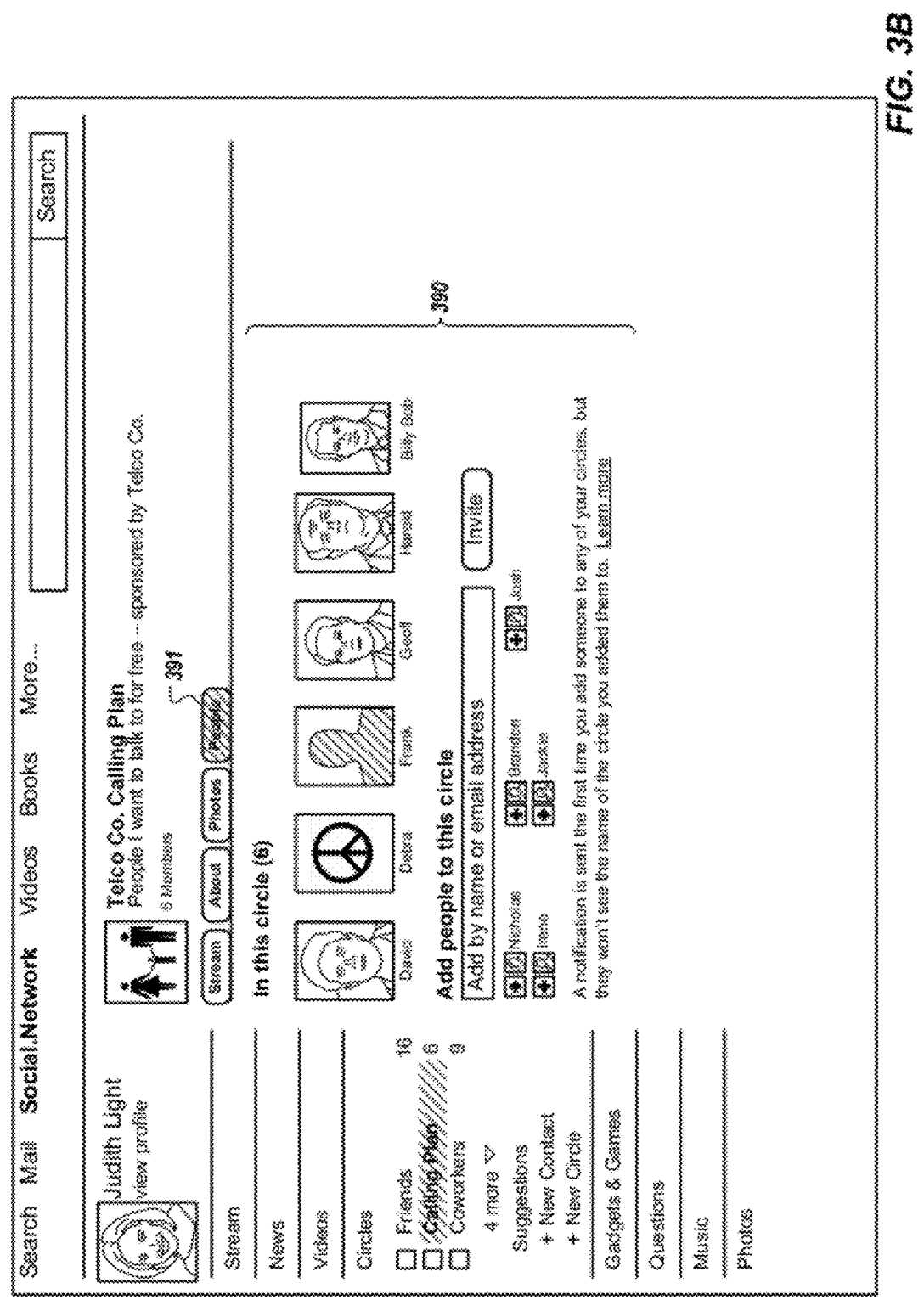

FIG. 3B depicts a screen-shot of an example people page 390 for a social networking circle. The people page 390 is shown when a "People" tab 391 is selected by the user. In some implementations, the people page 390 includes a collection of controls and indicators that allow the user to identify and search for members of the social network that the user would like to add to particular circles. Where the user has identified the "Telco Co. Preferred Calling" circle 322e as the target circle for changes, the system may make additional checks when adding users to the circle. For example, the system may refer to a profile page of a user who is to be added in order to determine whether the user has listed a telephone number that can be provided to the telecommunications company.

Figure 4A:
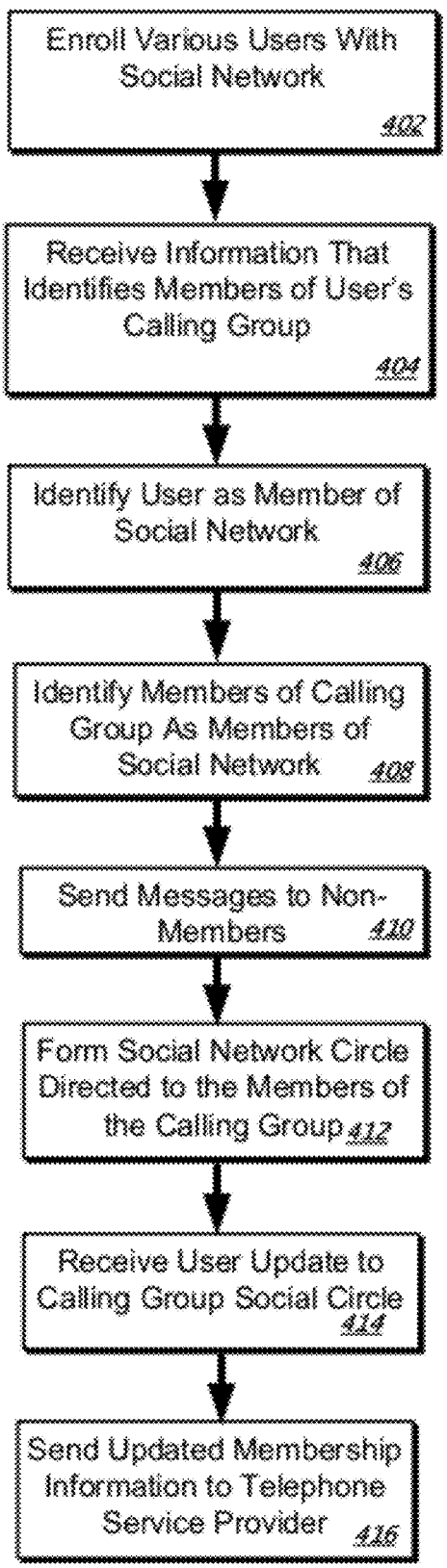
FIG. 4A is a flow chart of a process for sharing information from a social network with a telephone network.

FIG. 4A is a flow chart of a process for sharing information from a social network with a telephone network. In general, the process involves actions that may be taken by a social networking system that has been developed to interact with one or more telecommunication carriers. The actions may be for sharing social information about registered users who are common to the social network and the particular telecommunication carrier (also referred to here as a telephone service provider).

The process begins at box 402, where the social network enrolls various users. Such enrollment may occur by traditional mechanisms, such as by existing users who invite other users to enroll with the social network. When enrolling, a user may provide to the social network system profile information about themselves that may assist the system in improving the services that are offered to such users. For example, users may provide their gender, age, hobbies, interests, and other information that they are willing to share with the system. In addition, the users may provide both private and public contact information. As one example, a user may provide an e-mail address that may be used by the system in communicating with the user, and may also be made available to certain other users by approval from the providing user. For instance, the first user may not want the user's e-mail address to be publicly available, but may be willing to share it with friends who are in certain ones of the user's social networking circles. Similarly, the user may supply one or more telephone numbers that may be shown to certain ones of the user's friends.

At box 404, the system receives information that identifies members of the user's calling group. For example, when the user originally signed up with the social network, the user may have indicated that he or she is a subscriber for a particular wireless telephone carrier. In response to such an indication, the social network may have automatically generated a communication to the identified carrier to obtain existing calling group information for the user. The social network may have established a pre-existing business relationship with the carrier, so that the social network may supply the carrier with telephone numbers, and the carrier may return other telephone numbers that are in a calling group that correspond to the supplied number. Both systems may have done so after obtaining prior approval from the user to share such information. Alternatively, the information may have arrived at the social network independently of a request for such information, so that the social network is required to identify the user for whom the information is intended.

At box 406, such an identification is made. In particular, the account of the user whose account is associated with the calling group is checked to confirm that the user are a user of the social network with a registered account. Such an operation may include performing a lookup on a user identifier, such as a telephone number for the user, with the profile of the social network.

At box 408, the process identifies members of the calling group as members of the social network. Again, phone numbers supplied by the carrier for each of the other members may be checked against phone numbers in profiles of registered members of the social network.

At box 410, the process fails to find matching phone numbers for certain of the members, and thus concludes that those members might not be members of the social network. As a result, the process may send a communication to the first user asking the first user to provide additional identifying information about the other members. Such additional identifying information may be used to further search for matches among existing members of the social network, or may be used to generate communications to such people to encourage them to become members of the social network. For example, the system may send information for display to the first user to inform the first user that it does not have a match for a particular phone number, and may request that the first user provide an e-mail address for the person assigned to that phone number. The system may then generate an e-mail to be sent to that person, and the e-mail may include a hyperlink that directs that person to the social network site with the ability to enroll with the social network site. The system may send a text message to the particular phone number. The text message may request that a recipient of the particular phone number link the phone number to a social network account, for example, by selecting a link in the text message to log into their social network account or to set up a new social network account.

At box 412, once the process has identified existing subscribers who are members of the plan and attempted to enroll people who are not subscribers of the social network, it defines a social network circle. Such action may involve creating a social network circle object that contains each of the members. Such organization is represented graphically, for example, in FIG. 3A. A user may then interact conveniently with the circle using the UI 301 described above or other mechanisms, and such interaction may involve changes to the membership of the calling group circle (box 414). When such changes occur, the changes may then be communicated to the telephone service provider, or carrier (box 416), so that the actual calling group stays automatically and dynamically synchronized with the calling group circle. In some examples, the social network circle is defined without receiving input from the user after the system receives information that identifies members of the user's calling group and before the social network circle is defined by the system. In other words, the social network circle may be defined automatically. In some examples, the social network circle is defined without receiving input from the user that specifies the members of the social network circle.

Figure 4B:
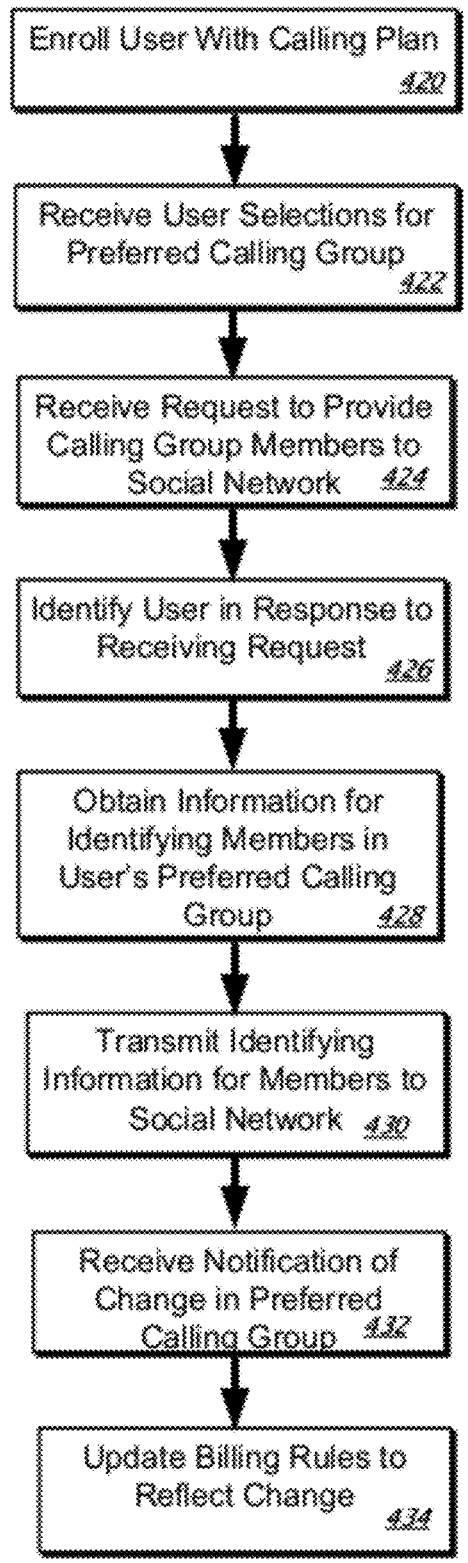
FIG. 4B is a flow chart of a process for sharing information from a telephone network with a social network.

FIG. 4B is a flow chart of a process for sharing information from a telephone network with a social network. In general, the process includes operations similar to those in FIG. 4A, but from the perspective of a telephone carrier or service provider. The process begins at box 402, where subscribers of the carrier are enrolled with calling plans. At the same or a later time, the users may enroll with a preferred calling group (box 422) where such an option is offered by the carrier. The preferred calling group may comprise a set number of telephone numbers or handsets that are allowed to make unlimited calls or discounted calls to each other, and are typically associated with members of a single family. Such enrollment may occur, for example, where multiple telephones are purchase together (e.g., by a family) and a sales agent may activate them together so that they all fall within a preferred calling plan. Alternatively, a user may interact with an IVR or operator in identifying the other numbers the user would like to have in a calling plan.

Such activity may be the end of the users' interactions with the carrier, or if the user is a member of a social network, the user may so notify the carrier so as to request that the carrier provide identifying information for other members to a social network (box 424). In response to such a request, the carrier may identify the user (box 426), such as by tracking a number from which the user has called into an IVR system, having the user log into a web site, or in other known manners. The process may then look up the identities of the other members who are in the first user's preferred calling group (428) and may transmit information about those other members to a social network of which the first user is a member (box 430). The process may have determined that the user is a member of the social network by the user identifying such a relationship to the carrier (e.g., when activating an account) or by the social network making an electronic request of the carrier according to an API between the social network and the carrier (e.g., where the social network may make such requests only when asked to do so by the user).

The carrier may then go dormant with respect to communications with the social network. After some time, however, at box 432, the carrier may receive from the social network a notification about changes that have been made to the constitution of the preferred calling group. For example, a user may have interacted with a circle for the group in manners like those discussed above for FIGS. 3A and 3B, to add or remove members from the circle. The notification from the social network may thus be to the same effect, and at box 434, the carrier may act to synchronize the actual preferred calling group with the preferred calling group circle, so as to update billing rules for calls made to and from the user (box 434).

Figure 5:
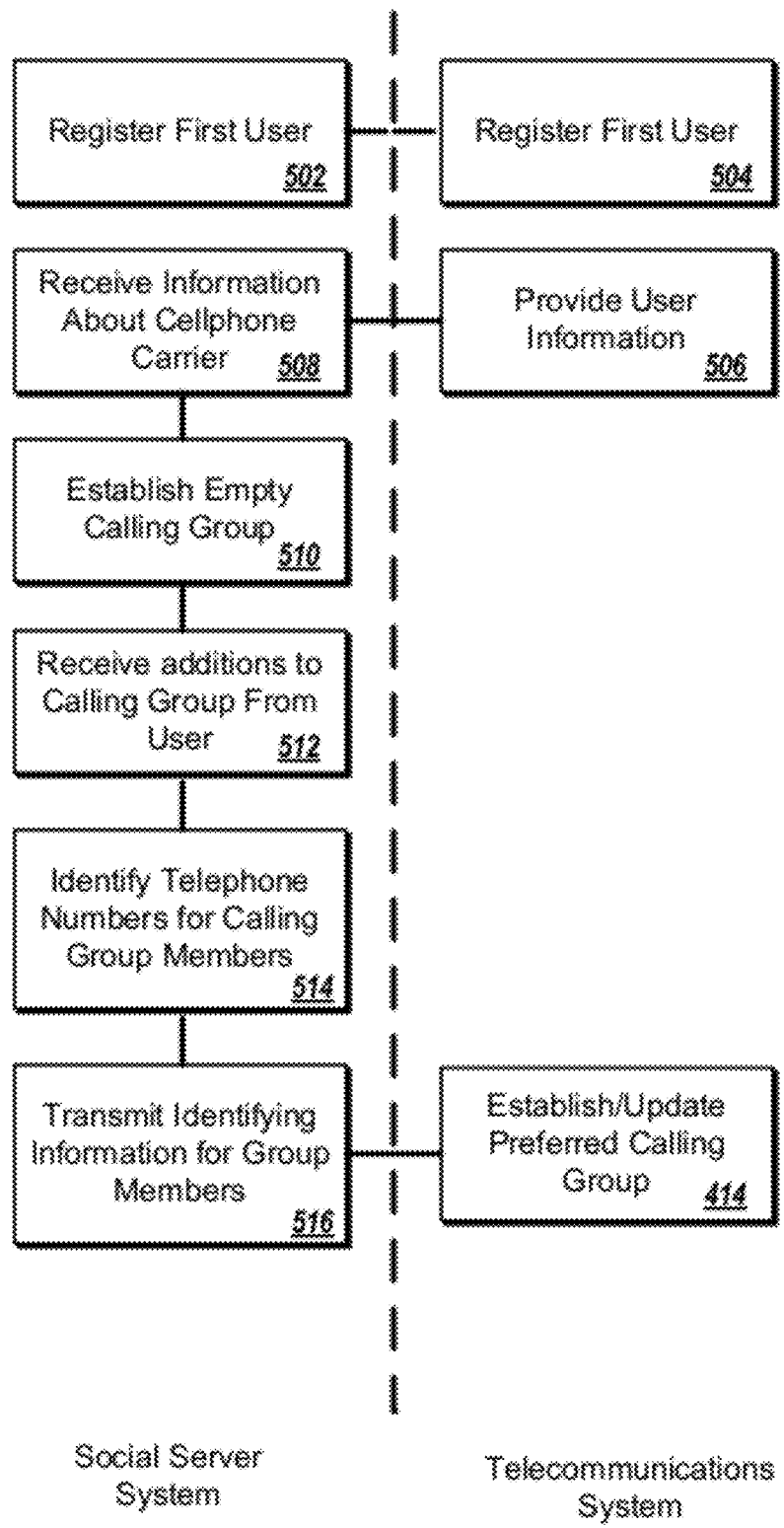
FIG. 5 is a swim lane diagram of a process for sharing information about a user between a social network and telephone network with which the user is a member.

FIG. 5 is a swim lane diagram of a process for sharing information about a user between a social network and telephone network with which the user is a member. The process shown here is similar to those in FIGS. 4A and 4B, but shows examples of coordinated actions that may be performed by a social network server system and a telecommunications system, such as a system run by a wireless telephone carrier or VoIP carrier. The process begins at boxes 502, 504, where various users register with both systems. The registrations may happen, for the most part, in ordinary manners, though certain of the users may provide to one of the systems information that allows them to be identified by the other system, such as a user ID, email address, or telephone number, as the case may be. In this example, the sharing of information occurs initially from the telecommunications system to the social server system, though the initial communication could occur from the social server system to the telecommunications system. Specifically, at box 506, the telecommunications system provides information about users to the social server system, which receives the information about the carrier at box 508. In one example, the information includes the telephone number and perhaps the name of the subscriber.

In this example, the subscriber's social network account is relatively new and does not have a preexisting circle for the user's calling plan, so, at box 510, the social server system establishes an empty social circle. There is nothing yet to fill the circle because the user had not yet established members for a preferred calling plan at the telecommunications system, preferring instead to use the superior user interface offered by the social network system. The subscriber does so at box 512, such as by using an interface like that shown in FIGS. 3A and 3B above. For example, the user may generate a social networking circle and select a graphical user interface element that flags the social networking circle as identifying members of a preferred calling plan. A user may be limited to selecting a single circle as identifying members of a preferred calling plan, or may be limited to selecting a single circle for such a preferred calling plan per wireless carrier with which the user is associated. At box 514, the social server system identifies that a relevant change has been made to a calling plan circle, and in response, it identifies telephone numbers for members who have been added to the circle, such as by checking profiles for those users. With the information gathered, the social server system transmits identifying information for the new circle members (box 516), so that the telecommunications system can either update or establish a preferred calling group.

Figure 6:
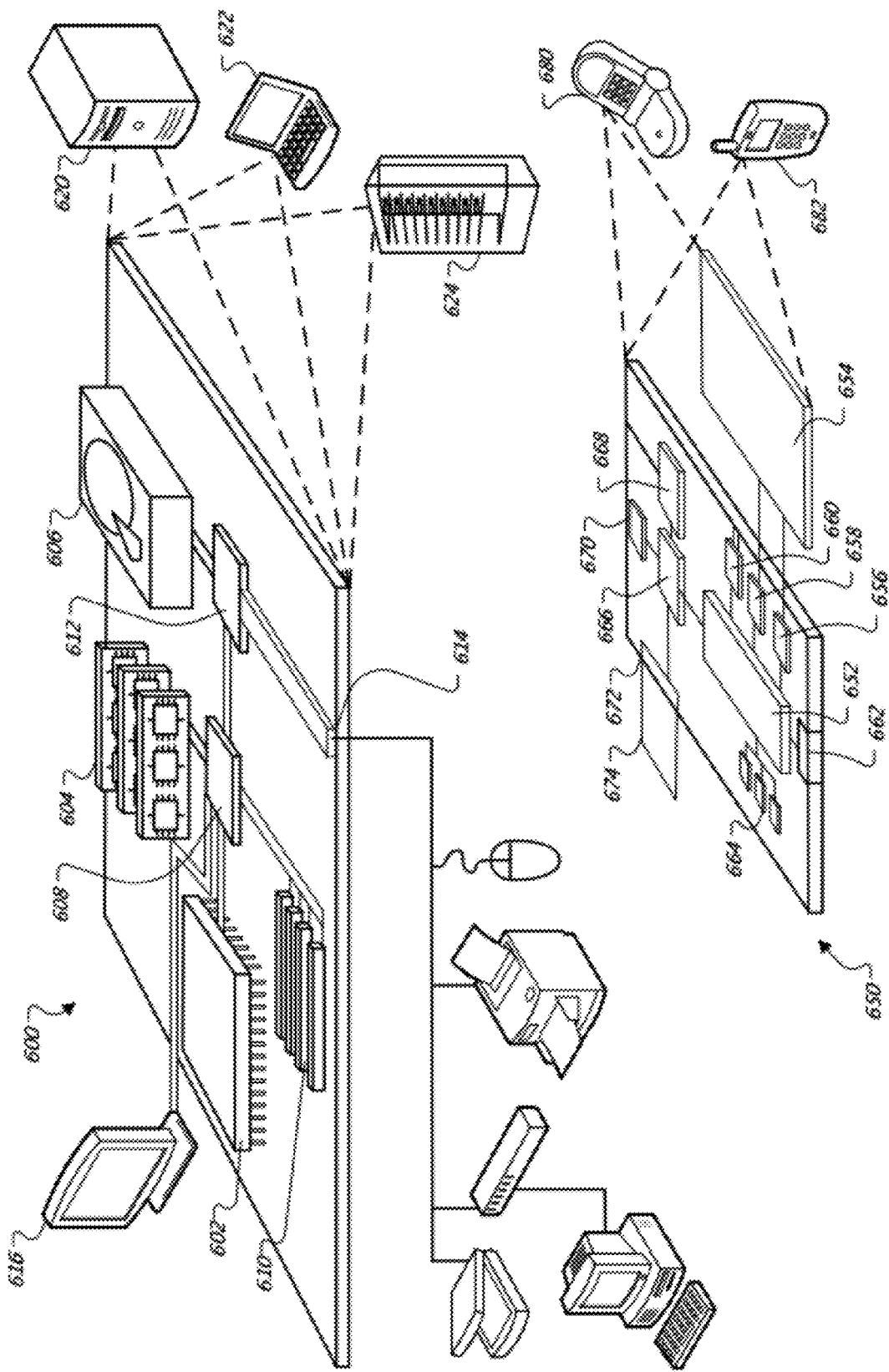
FIG. 6 is a block diagram of computing devices that may be used to implement the systems and methods described in this document, as either a client or as a server or plurality of servers. Like reference numbers represent corresponding parts throughout.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be examples only, and are not meant to limit implementations of the technology described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is but one example allocation. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. A server system may comprise one or more individual servers. A server system may be a combination of hardware and software that provides a service or a set of services. For example, a set of physically separate and networked computerized devices may operate together as a logical server system unit to handle the operations necessary to offer a service to hundreds of computing devices. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A computer-implemented method of sharing social information between a social network service and a telephone service provider, the method comprising:
   receiving, at a server system of a social network and as having been sent from a telephone service provider, information identifying members of a preferred calling group for a first user that is associated with the telephone service provider, the first user having submitted the information that identifies the members of the preferred calling group to the telephone service provider;
   identifying, using the server system of the social network, the first user as a member of the social network;
   identifying, using the server system of the social network, multiple members of the preferred calling group as being multiple respective members of the social network; and
   automatically defining, using the server system of the social network and as a result of having received the information identifying the members of the preferred calling group from the telephone service provider, a first social network group that includes the multiple members of the preferred calling group who are members of the social network, wherein:
      the first social network group is one of a plurality of social network groups that the first user is associated with on the social network in order to enable the first user to distribute posts to each of the plurality of social network groups, each of the plurality of social network groups arranged to restrict distribution of content that the first user posts to the respective social network group to members of the social network that are included in the respective social network group; and
      automatically defining the first social network group causes the server system of the social network to synchronize membership of the first social network group with the information that identifies the members of the preferred calling group at the telephone service provider.

2. The method of claim 1, wherein automatically defining the first social network group comprises adding the multiple members to a preexisting social network group.

3. The method of claim 1, wherein the information identifying members of the preferred calling group for the first user comprises telephone numbers for members of the preferred calling group.

4. The method of claim 3, wherein identifying multiple members of the preferred calling group as being multiple respective members of the social network comprises comparing the received telephone numbers with telephone numbers in profiles of registered members of the social network, the telephone numbers in profiles of the registered members being visible in the profile pages to at least one other member of the social network.

5. The method of claim 1, further comprising:
   receiving, from the first user, a desired change to membership of the defined first social network group; and
   sending, by the server system of the social network, to the telephone service provider, an indication of the desired change.

6. The method of claim 1, further comprising:
   receiving, at the server system of the social network and from the first user, an indication of a second user to be included in a no contact group; and
   sending, to the telephone service provider, information identifying the second user for special handling of incoming calls from the second user.

7. The method of claim 6, further comprising:
   automatically blocking posts submitted by the first user to the server system of the social network from being seen by the second user included in the no contact group.

8. The method of claim 1, further comprising:
   automatically causing ring tones for a telephone of the first user to correlate to respective ones of the plurality of social network groups of the first user.

9. One or more tangible machine-readable storage media having recorded thereon instructions that, when executed by one or more processors, perform operations comprising:
   receiving, at a server system of a social network and as having been sent from a telephone service provider, information identifying members of a preferred calling group for a first user that is associated with the telephone service provider, the first user having submitted the information that identifies the members of the preferred calling group to the telephone service provider;
   identifying, using the server system of the social network, the first user as a member of the social network;
   identifying, using the server system of the social network, multiple members of the preferred calling group as being multiple respective members of the social network; and
   automatically defining, using the server system of the social network and as a result of having received the information identifying the members of the preferred calling group from the telephone service provider, a first social network group that includes the multiple members of the preferred calling group who are members of the social network, wherein:
      the first social network group is one of a plurality of social network groups that the first user is associated with on the social network in order to enable the first user to distribute posts to each of the plurality of social network groups, each of the plurality of social network groups arranged to restrict distribution of content that the first user posts to the respective social network group to members of the social network that are included in the respective social network group; and automatically defining the first social network group causes the server system of the social network to synchronize membership of the first social network group with the information that identifies the members of the preferred calling group at the telephone service provider.

10. A computer-implemented system for sharing social information between a social network service and a telephone service provider, the system comprising:
 a social network server system to implement a social networking service that includes:
  a social graph that defines connections between registered users of the social networking service;
  a grouping sub-system arranged to define a plurality of sub-groups of registered users who have an acquaintance relationship with a first user, wherein each sub-group in the plurality of sub-groups is defined based on a relationship that applies to each user in the sub-group, and each sub-group in the plurality of sub-groups is configured to restrict distribution of content that the first user posts to the respective one of the plurality of sub-groups to the registered users of the social networking service that are in the respective one of the plurality of sub-groups;
  an interface arranged to communicate with a telephone service provider and to send to the telephone service provider an indication of users in a preferred calling sub-group so as to cause the telephone service provider to synchronize information used by the telephone service provider for offering the first user preferred telephone services with information at the social networking service that identifies the users in the preferred calling sub-group, wherein the preferred calling sub-group is included as one of the plurality of sub-groups of registered users who have an acquaintance relationship with the first user, and the preferred telephone services provide a preferred billing arrangement for the first user for telephone communications between the first user and the users in the preferred calling sub-group.

11. The system of claim 10, wherein at least one user in the preferred calling sub-group is not a subscriber of the telephone service provider and is a subscriber of a different telephone service provider.

12. The system of claim 10, wherein the grouping sub-system is arranged to (i) allow the first user to change membership of the preferred calling subgroup by adding or removing registered users who have an acquaintance relationship with the first user to or from the preferred calling sub-group, respectively, (ii) receive an identification of a change desired by the first user to the membership of the preferred calling sub-group, and (iii) send, via the interface and to the telephone service provider, an indication of the change.

13. The system of claim 10, wherein the social network server system is programmed to obtain telephone information that is included in profiles for the users of the preferred calling sub-group, and to send the telephone information to the telephone service provider.

14. The system of claim 10, wherein:
 the grouping sub-system is arranged to use telephone numbers that have been received from the telephone service provider to identify those registered users of the social network service who are in a preferred calling plan that is offered to the first user by the telephone service provider for providing the preferred telephone services to the first user; and identifying the registered users who are in the preferred calling plan comprises comparing the telephone numbers with telephone numbers in profiles of registered users of the social network service, the telephone numbers in the profiles of registered users being visible in profiles of the registered users to at least one other registered user of the social network service.

15. The system of claim 10, wherein the grouping sub-system is arranged to define a no contact sub-group that is managed by the first user, and that is included among the plurality of sub-groups of registered users who have an acquaintance relationship with the first user, and, (ii) to send, via the interface of the social network server system and to the telephone service provider, information for causing the telephone service provider to block calls that are to the first user and that are from one or more users in the no contact sub-group.

16. The system of claim 15, wherein the social network server system further includes a messaging sub-system arranged to automatically block posts that are authored by the first user from being presented for display to the one or more users in the no contact sub-group.

17. A computer-implemented method of sharing social information between a social networking service and a telephone service provider, the method comprising:
 identifying, by a server system of the telephone service provider, a first user of the telephone service provider and one or more other users of the telephone service provider who are members of a preferred calling plan that is provided for the first user by the telephone service provider;
 obtaining, by the server system of the telephone service provider, information that identifies the first user and the one or more other users; and
 providing the obtained information to a social network server system that implements the social networking service for definition, by the social network server system, of a first social network sub-group of those registered users of the social networking service with which the first user has an acquaintanceship relationship, the sub-group containing the one or more other users, wherein:
  the first social network sub-group is one of a plurality of social network sub-groups that the first user is associated with on the social networking service in order to enable the first user to distribute posts to each of the plurality of social network sub-groups, each of the plurality of social network sub-groups arranged to restrict distribution of content that the first user posts to the respective social network sub-group to members of the social networking service that are included in the respective social network sub-group; and
  providing the obtained information to the social network server system causes the social network server system to synchronize membership of the first social network sub-group with information at the telephone service provider that identifies the one or more other users of the telephone service provider who are members of the preferred calling plan that is provided for the first user by the telephone service provider.

18. The method of claim 17, further comprising:
 receiving, from the social network server system and by the telephone service provider server system, a request that the telephone service provider server system provide sub-group information for the first user, the request including an identifier for the first user; and in response to receiving the request, transmitting, to the social network server system, the obtained information that identifies the first user and the one or more other users of the telephone service provider who are members of the preferred calling plan for the first user.

19. The method of claim 18, wherein the identifier comprises a telephone number for the first user that is visible to one or more other users of the social networking system in a profile page for the first user.

20. The method of claim 17, further comprising, after providing the obtained information, receiving, from the social network server system and by the telephone service provider server system, identifiers for one or more users of the telephone service provider that are not the one or more other users who are the members of the preferred calling plan, and updating membership of the preferred calling plan to include the one or more users of the telephone service provider that are not the one or more other users.

21. The method of claim 17, further comprising billing calls between the first user and users of the preferred calling plan in a preferred manner compared to calls between the first user and users that are not in the preferred calling plan.

22. One or more tangible machine-readable storage media having recorded thereon instructions that, when executed by one or more processors, perform operations comprising:
identifying, by a server system of the telephone service provider, a first user of the telephone service provider and one or more other users of the telephone service provider who are members of a preferred calling plan that is provided for the first user by the telephone service provider;
obtaining, by the server system of the telephone service provider, information that identifies the first user and the one or more other users; and
providing the obtained information to a social network server system that implements the social networking service for definition, by the social network server system, of a first social network sub-group of those registered users of the social networking service with which the first user has an acquaintanceship relationship, the sub-group containing the one or more other users wherein:
the first social network sub-group is one of a plurality of social network sub-groups that the first user is associated with on the social networking service in order to enable the first user to distribute posts to each of the plurality of social network sub-groups, each of the plurality of social network sub-groups arranged to restrict distribution of content that the first user posts to the respective social network sub-group to members of the social networking service that are included in the respective social network sub-group; and
providing the obtained information to the social network server system causes the social network server system to synchronize membership of the first social network sub-group with information at the telephone service provider that identifies the one or more other users of the telephone service provider who are members of the preferred calling plan that is provided for the first user by the telephone service provider.

23. A computer-implemented system for sharing social information between a social network service and a telephone service provider, the system comprising:
a telephone service provider server system that includes:
a connection system arranged to transmit voice data between callers and callees;
a billing module to track calls made between the callers and callees and to adjust accounts of at least some of the callers and callees, wherein certain of the callers and callees are members of preferred calling plans for which the billing module applies special adjustment rules; and
a social interface programmed to communicate with one or more social networking systems and to update membership in at least some of the preferred calling plans based on information that is received from the one or more social networking systems, wherein:
the information that is received from the one or more social networking systems reflects changes in the membership of respective preferred calling social network groups for respective users who are registered on the one or more social networking systems and who are among the certain of the callers and callees that are members of the preferred calling plans, the respective preferred calling social network groups being configured to enable the respective users to restrictively distribute content that the respective users post to their respective preferred calling social network groups to other registered users that are included in the respective preferred calling social network groups without distributing the content to users that are not included in the respective preferred calling social network groups, and
updating the membership in the at least some of the preferred calling plans causes the membership in the at least some of the preferred calling plans of the telephone service provider server system to synchronize with membership of the respective preferred calling social network groups at the one or more social networking systems.

24. The system of claim 23, wherein the telephone service provider server system is programmed to receive, from the one or more social network server systems, requests that the telephone service provider server system provide sub-group information for one or more subscribers of the telephone service provider server system, and in response to receiving at least some of the requests, to transmit the sub-group information to the one or more social networking server systems, respectively, the sub-group information identifying membership in the preferred calling plans.

25. The system of claim 23, wherein the telephone service provider server system is programmed to receive, from the one or more social networking server systems, identifiers for members of the preferred calling plans, and to update membership of the preferred calling plans to include the identified members.

26. The system of claim 25, wherein the billing module of the telephone service provider server system is programmed to bill calls between subscribers of the telephone service provider in a preferred manner based on the information that is received from the one or more social networking systems that reflects changes in the membership of the respective preferred calling social network groups.

27. The method of claim 1, wherein the telephone service provider is arranged to process calls between the first user and the members of the preferred calling group for the first user without requesting information about the preferred calling group from the social network service.

28. The method of claim of 1, wherein the telephone service provider is arranged to provide the first user with no additional cost or reduced rate billing for calls between the first user and the members of the preferred calling group for the first user due to the members of the preferred calling group being members of the preferred calling group.

29. The method of claim 28, wherein the telephone service provider is arranged to store the information that identifies the members of the preferred calling group at the telephone service provider simultaneous with the server system of the social network storing information that characterizes the first social network group that includes the multiple members of the preferred calling group for the first user.

* * * * *

UNITED STATES PATENT AND TRADEMARK OFFICE
CERTIFICATE OF CORRECTION

PATENT NO.        : 8,630,398 B2  
APPLICATION NO.   : 13/336922  
DATED             : January 14, 2014  
INVENTOR(S)       : Gundotra et al.

It is certified that error appears in the above-identified patent and that said Letters Patent is hereby corrected as shown below:

In the Claims:

Column 30, line 9, in Claim 15, after "arranged" insert -- (i) --.

Column 32, line 64, in Claim 28, after "claim" delete "of".

Signed and Sealed this
Twentieth Day of May, 2014

Michelle K. Lee
*Deputy Director of the United States Patent and Trademark Office*